US009848356B2

(12) United States Patent
Huh et al.

(10) Patent No.: US 9,848,356 B2
(45) Date of Patent: Dec. 19, 2017

(54) APPARATUS AND METHOD FOR BALANCING TRAFFIC LOAD USING INTER-SITE CARRIER AGGREGATION

(71) Applicant: Samsung Electronics Co., Ltd., Suwon-si, Gyeonggi-do (KR)

(72) Inventors: Hoon Huh, Yongin-si (KR); Myoungseok Kim, Seongnam-si (KR); Seunghyeon Nahm, Yongin-si (KR); Jaeyoung Lee, Seoul (KR); Jaeho Jeon, Seongnam-si (KR); Sungkwon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 14/919,027

(22) Filed: Oct. 21, 2015

(65) Prior Publication Data

US 2016/0112902 A1 Apr. 21, 2016

Related U.S. Application Data

(60) Provisional application No. 62/066,530, filed on Oct. 21, 2014.

(30) Foreign Application Priority Data

Jan. 27, 2015 (KR) ........................ 10-2015-0012788

(51) Int. Cl.

*H04W 4/00* (2009.01)
*H04W 28/02* (2009.01)

(Continued)

(52) U.S. Cl.

CPC ..... *H04W 28/0289* (2013.01); *H04L 43/0876* (2013.01); *H04W 28/0284* (2013.01);

(Continued)

(58) Field of Classification Search

CPC combination set(s) only.
See application file for complete search history.

(56) References Cited

U.S. PATENT DOCUMENTS 8,606,274 B2 12/2013 Borst et al.
2013/0223403 A1 8/2013 Chen et al.

(Continued)

FOREIGN PATENT DOCUMENTS

CN 102685807 A 9/2012
CN 103416089 A 11/2013

(Continued)

OTHER PUBLICATIONS

Sanchez et al, LTE-Advanced HetNet Investigation Under Realistic Conditions, Master's Thesis, Aalborg University, 114 pages, Jun. 2014.*

(Continued)

*Primary Examiner* — Frank Duong
(74) *Attorney, Agent, or Firm* — Jefferson IP Law, LLP

(57) ABSTRACT

A method for selecting a serving cell by a user equipment (UE) to which the inter-site carrier aggregation (CA) technology is according to the intensity of a reception signal of each carrier wave is provided. However, in order to improve resource usage and a throughput of the entire cells, a method is performed in which a PCell and an SCell are selected considering the intensity of a reception signal and a load between cells, the SCell is activated, and loads of the PCell and the SCell are adjusted. The method can balance an inter-cell traffic load, and eventually, increase usage of the entirety of a network and improve a throughput.

12 Claims, 17 Drawing Sheets

(51) Int. Cl.

*H04W 28/08* (2009.01)
*H04L 12/26* (2006.01)
*H04W 72/04* (2009.01)
*H04L 12/801* (2013.01)

(52) U.S. Cl.

CPC ............. *H04W 28/08* (2013.01); *H04L 47/29* (2013.01); *H04W 72/0486* (2013.01)

(56) References Cited

U.S. PATENT DOCUMENTS

| | | | | |
|---|---|---|---|---|
| 2014/0098661 | A1 | 4/2014 | Huang | |
| 2014/0098670 | A1* | 4/2014 | Choi | H04L 5/00 370/235 |
| 2014/0148149 | A1 | 5/2014 | Kwan et al. | |
| 2016/0205685 | A1* | 7/2016 | Wang | H04L 5/001 370/229 |

FOREIGN PATENT DOCUMENTS

| | | | |
|---|---|---|---|
| EP | 2 234 436 | A1 | 9/2010 |
| WO | 00/72618 | A1 | 11/2000 |
| WO | 2009/002241 | A1 | 12/2008 |

OTHER PUBLICATIONS

Sonia Barcos Sanchez et al., Master's Thesis LTE-Advanced HetNet Investigations Under Realistic Conditions, Jun. 1, 2014, XP055408271.

* cited by examiner

F1
F2
SCENARIO 1 ~ 400
SCENARIO 2 ~ 410
SCENARIO 3 ~ 420
SCENARIO 4 ~ 430
SCENARIO 5 ~ 440

APPARATUS AND METHOD FOR BALANCING TRAFFIC LOAD USING INTER-SITE CARRIER AGGREGATION

CROSS-REFERENCE TO RELATED APPLICATION(S)

This application claims the benefit under 35 U.S.C. §119 (e) of a U.S. Provisional application filed on Oct. 21, 2014 in the U.S. Patent and Trademark Office and assigned Ser. No. 62/066,530, and under 35 U.S.C. §119(a) of a Korean patent application filed on Jan. 27, 2015 in the Korean Intellectual Property Office and assigned Serial number 10-2015-0012788, the entire disclosure of which is hereby incorporated by reference.

TECHNICAL FIELD

The present disclosure relates to inter-site carrier aggregation. More particularly, the present disclosure relates to a method and apparatus for balancing traffic load between cells.

BACKGROUND

The carrier aggregation (CA) technology, which is a technology which improves a data transmission rate by combining two or more component carriers and transmitting the combined component carriers in broadband, has been introduced to high speed packet access (HSPA), long-term evolution (LTE), etc. of 3rd generation part nership project (3GPP) corresponding to the cellular mobile communication standard. The CA technology can effectively increase a data transmission rate by reusing the existing LTE system in an environment in which it is difficult for mobile communication service providers to retain bands continuing for 20 MHz or more, can be flexibly installed, can be compatible with the existing technology, and can operate a different network for each carrier wave, thereby implementing a heterogeneous network. However, since coverage of a cell for each carrier wave is different due to a radio property difference between frequencies or use of different antennas, a cell having the best channel environment for each carrier wave at a location of a user may belong to different evolved node Bs (eNBs). The inter-cell CA technology, which aggregates carrier waves belonging to different eNBs, is called the inter-site CA technology.

The above information is presented as background information only to assist with an understanding of the present disclosure. No determination has been made, and no assertion is made, as to whether any of the above might be applicable as prior art with regard to the present disclosure.

SUMMARY

A criterion for selecting a primary cell (PCell) and a secondary cell (SCell) by a user equipment (UE) to which the carrier aggregation (CA) technology is applied is according to an intensity of a reception signal of each carrier wave. However, in order to improve usage and a throughput of resources of the entire cells, it is necessary to select the PCell and the SCell by considering an inter-cell load. Therefore, a method of selecting the PCell and the SCell by considering an intensity of a reception signal and an inter-cell load is necessary.

Aspects of the present disclosure are to address at least the above-mentioned problems and/or disadvantages and to provide at least the advantages described below. Accordingly, an aspect of the present disclosure is to provide a method and apparatus for balancing traffic load between cells.

In accordance with an aspect of the present disclosure, a method of changing a serving cell by an evolved node B (eNB) in a wireless communication system using inter-cell CA is provided. The method includes calculating a difference value between a load of a serving cell for a first user equipment (UE) and a load of a neighboring cell for the first UE, determining whether the difference value between the loads of the serving cell and the neighboring cell for the first UE is larger than a first threshold value, and determining a load offset of the first UE as a first offset, when the difference value of the loads of the serving cell and the neighboring cell for the first UE is larger than the first threshold value, wherein the load of the serving cell for the first UE implies an amount of resources used by UEs other than the first UE from among the transmission resources of entire serving cells, and the load of the neighboring cell for the first UE implies an amount of resources used by UEs from among the transmission resources of entire neighboring cells.

Further, an eNB of changing a serving cell in a wireless communication system using inter-site CA is provided. The eNB includes a controller configured to calculate a difference value between a load of a serving cell for a first UE and a load of a neighboring cell for the first UE, determine whether the difference value between the loads of the serving cell and the neighboring cell for the first UE is larger than a first threshold value, and determine a load offset of the first UE as a first offset, when the difference value of the loads of the serving cell and the neighboring cell for the first UE is larger than the first threshold value, wherein the load of the serving cell for the first UE implies an amount of resources used by UEs other than the first UE from among the transmission resources of entire serving cells, and the load of the neighboring cell for the first UE implies an amount of resources used by UEs from among the transmission resources of entire neighboring cells.

In accordance with a method of selecting a PCell and an SCell by considering the intensity of a reception signal and an inter-cell load according to an embodiment of the present disclosure, a load between the PCell and the SCell is balanced, thereby increasing a resource usage rate of the entire cells and a throughput.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, the detailed description of embodiments of the present disclosure is made mainly based on a wireless communication system based on orthogonal frequency-division multiplexing (OFDM), particularly $3^{rd}$ generation partnership project (3GPP) evolved universal mobile telecommunications system (UMTS) terrestrial radio access (EUTRA) standard, but the subject matter of the present disclosure can be applied to other communication systems having a similar technical background and channel form after a little modification without departing from the scope of the present disclosure and the above can be determined by those skilled in the art.

Figure 1:
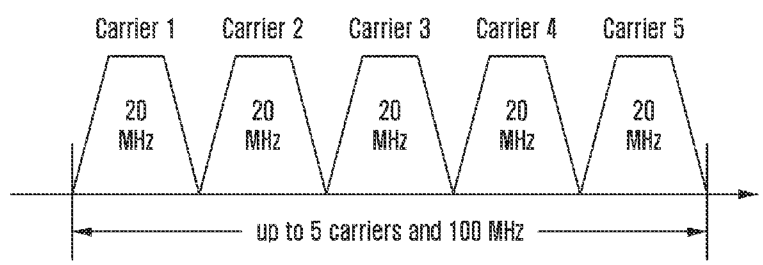
FIG. 1 is a view illustrating carrier aggregation (CA) of long term evolution (LTE) according to an embodiment of the present disclosure.

FIG. 1 is a view illustrating carrier aggregation (CA) of long term evolution (LTE) according to an embodiment of the present disclosure.

Referring to FIG. 1, when the CA technology of the LTE is used, an LTE system can combine maximally 5 carrier waves to use a bandwidth of maximally 100 MHz for data transmission. Further, since each component carrier wave is compatible with the existing single carrier wave, a terminal for supporting only a single carrier wave can be supported. A user equipment (UE), which uses the CA technology, maintains a radio resource control (RRC) connection with a cell of one carrier wave from among a plurality of carrier waves, and uses the other carrier waves as auxiliary carrier waves for data transmission without the RRC connection. The cell of the carrier wave, which maintains the RRC connection, is referred to as a primary cell (PCell), and cells of the auxiliary carrier waves are referred to as secondary cells (SCells).

Figure 2:
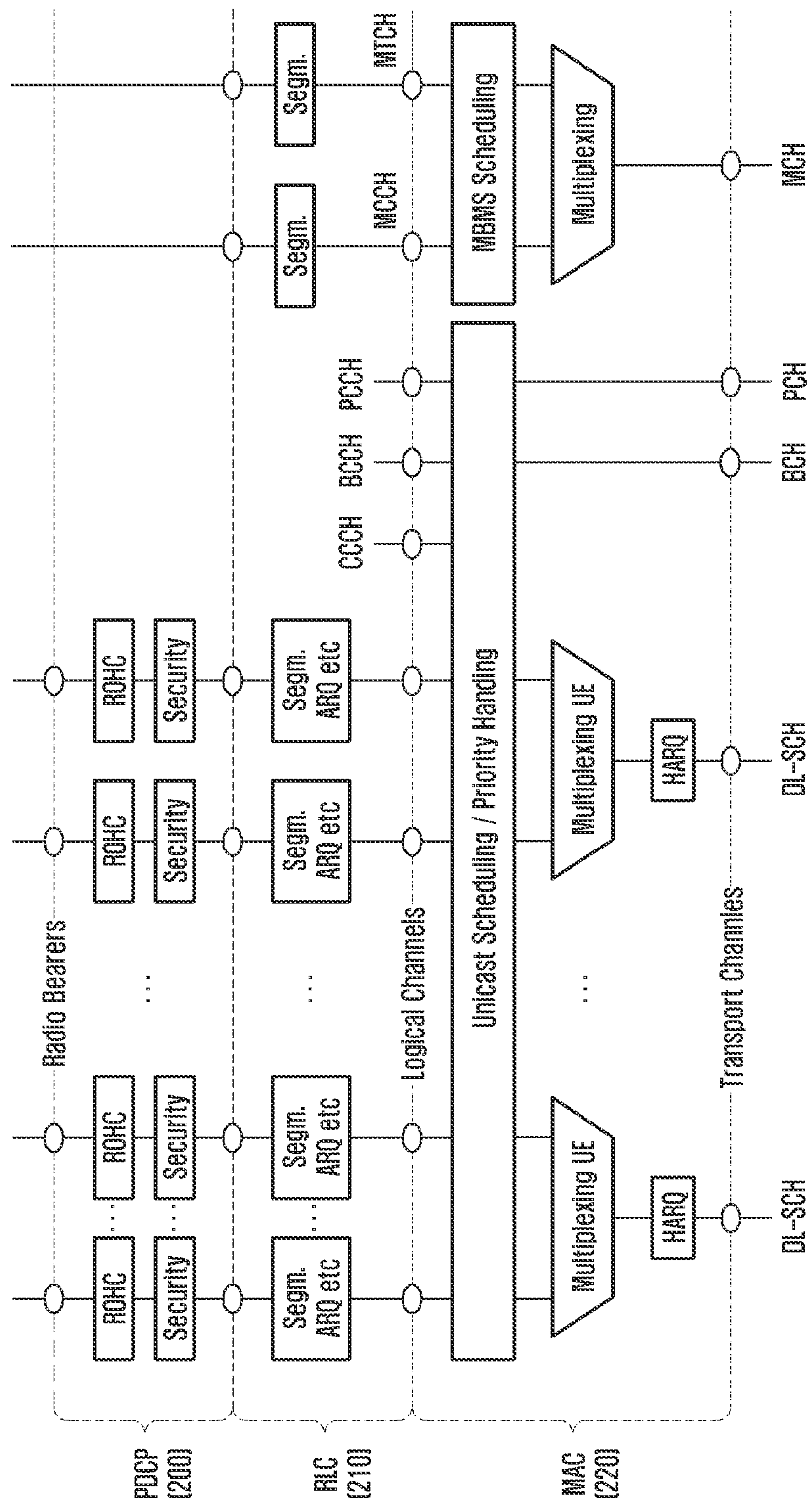
FIG. 2 is a view illustrating a data-side wireless access network protocol of the LTE according to an embodiment of the present disclosure.

FIG. 2 is a view illustrating a data-side wireless access network protocol of the LTE according to an embodiment of the present disclosure.

Referring to FIG. 2, the protocol includes a packet data convergence protocol (PDCP) layer 200, a radio link control (RLC) layer 210, a medium access control (MAC) layer 220, and a physical layer. The PDCP layer, which is the highest layer of the radio access network, processes a control signal and an interne protocol (IP) data packet and performs compression and encryption of a header of the data packet. The RLC layer, which is located between the PDCP layer and the MAC layer, serves to divide, arrange, and assemble a packet in a transmittable size, serves to retransmit a packet at packet loss, and maintains a buffer for scheduling in the MAC layer. The MAC layer, which is located between the RLC layer and the physical layer, performs data scheduling, multiplexing and demultiplexing of several logical channels of one user, and a hybrid automatic retransmission request (HARQ) function. The physical layer, which is not illustrated in the drawing and is the lowest layer, serves to perform error correction encoding and modulation/demodulation of a packet and perform physical signal generation.

Figure 3:
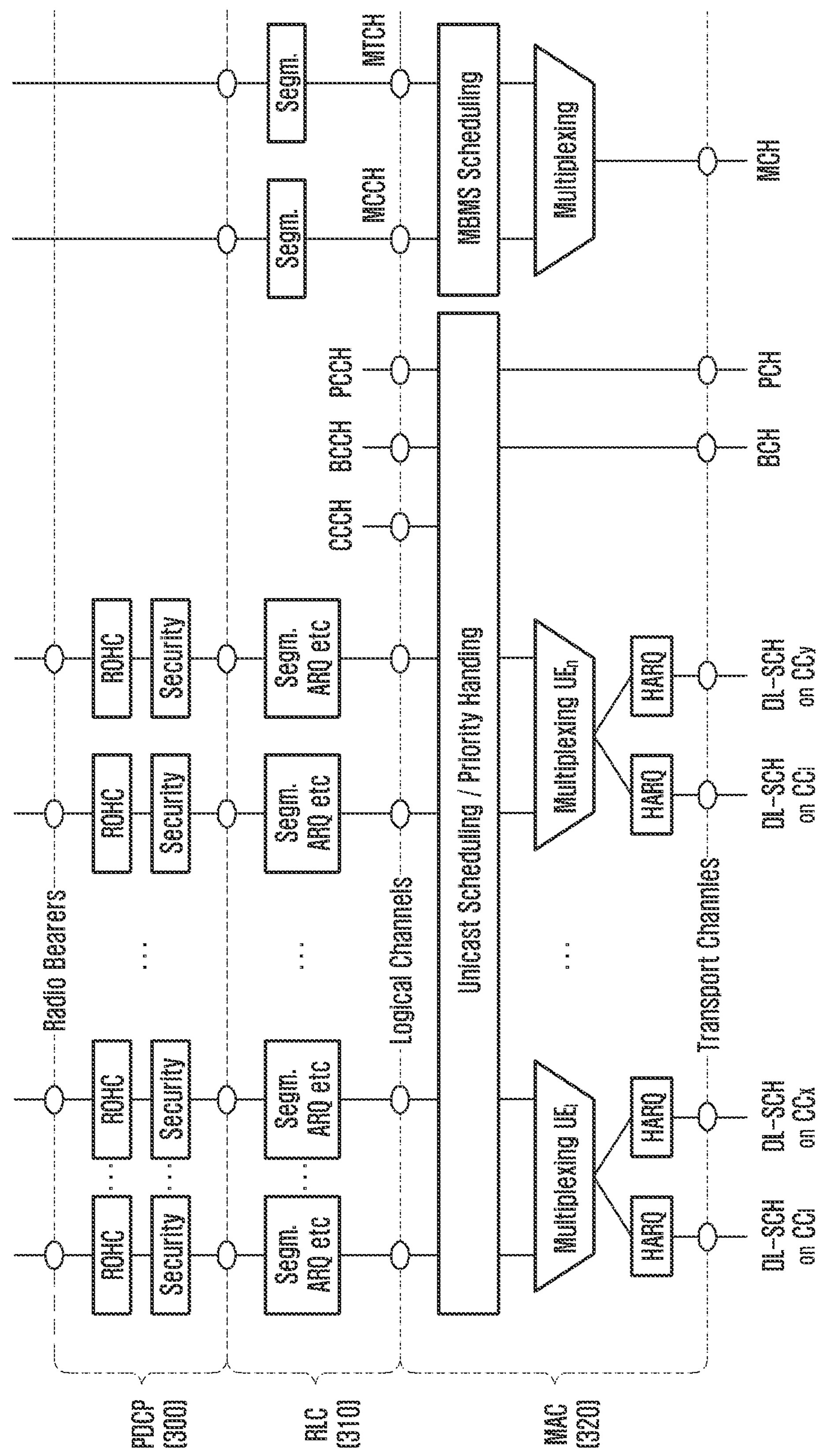
FIG. 3 is a view illustrating a protocol for the CA technology of the LTE according to an embodiment of the present disclosure.

FIG. 3 is a view illustrating a protocol for the CA technology of the LTE according to an embodiment of the present disclosure.

Referring to FIG. 3, in the LTE CA technology, in order for the compatibility with the prior art, the PDCP layer 300, the RLC layer 310, and the physical layer are maintained identically to the single carrier wave, and the MAC layer 320 serves to process CA. The RLC layer maintains one buffer at a single carrier wave or regardless of the number of carrier waves at the CA, and the MAC layer performs scheduling for multi carrier waves at the CA and receives a packet from a buffer of the RLC layer to allocate the packet to a resource of each carrier wave.

Figure 4:
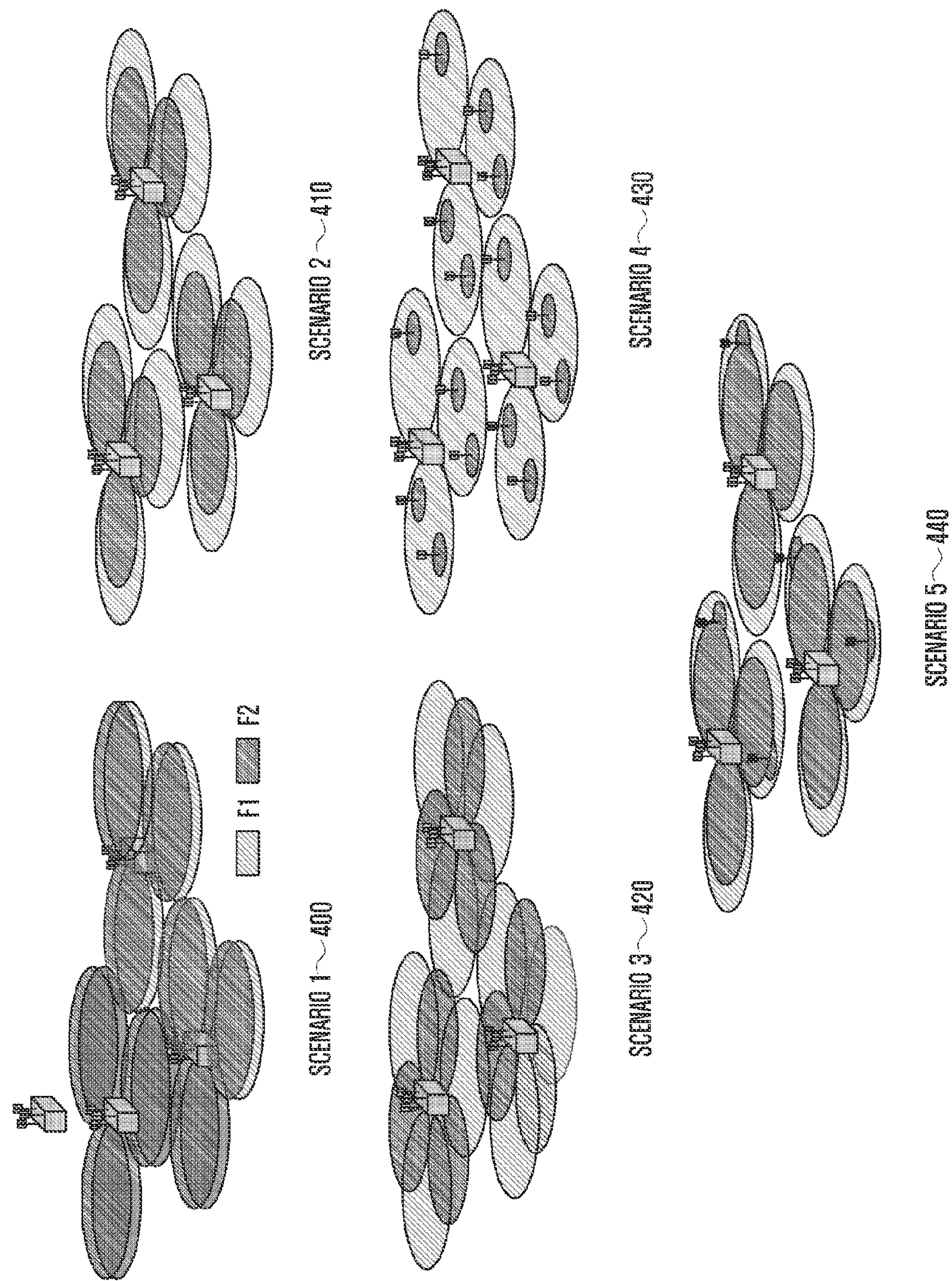
FIG. 4 is a view illustrating five types of wireless network scenarios according to a coverage of a component carrier wave and a system shape in the CA technology of the LTE according to an embodiment of the present disclosure.

FIG. 4 is a view illustrating five types of wireless network scenarios according to a coverage of a component carrier wave and a system shape in the CA technology of the LTE according to an embodiment of the present disclosure.

Referring to FIG. 4, scenario 1 400 and scenario 2 410 correspond to cases where directions of antennas of evolved node Bs (eNBs) of each carrier wave coincide with each other with regard to cases where coverage of two carrier waves are identical to each other and are different from each other. Scenario 5 440 corresponds to a case where a service area of a carrier wave having a small coverage is expanded through a wireless repeater based on scenario 2. Scenario 3 420 corresponds to a case where an antenna of an eNB of one carrier wave is arranged such that the center of a direction thereof faces a cell boundary region of another carrier wave. In scenario 4 430, one carrier wave constitutes large cells covering the entire region, and another carrier wave constitutes small cells arranged in a region where data demand is large.

Scenario 3 from among wireless network scenarios of FIG. 4 may be referred to as inter-site CA, and in scenario 3, since a direction of an antenna of each carrier wave faces a cell boundary region of another carrier wave, a data transmission rate of a user at the cell boundary region can be greatly improved as compared with scenario 1. However, in scenario 3, a combination of cells to which each carrier wave belongs may change according to a position and a channel environment of a user.

Figure 5:
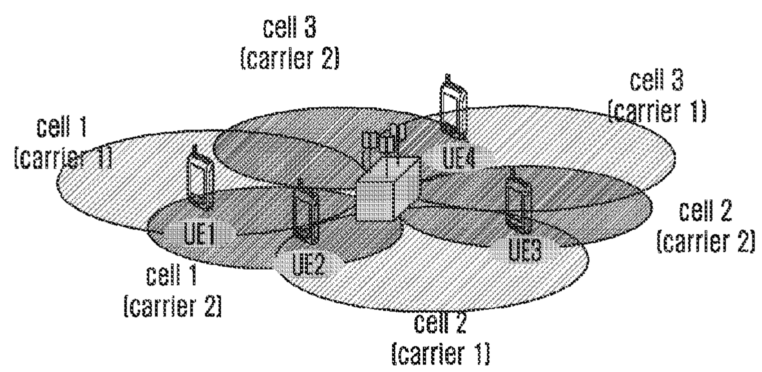
FIG. 5 is a view illustrating distribution of a cell and a user equipment (UE) connected to one evolved node B (eNB) in scenario 3 of FIG. 4 according to an embodiment of the present disclosure.

FIG. 5 is a view illustrating distribution of a cell and a UE connected to one eNB in scenario 3 of FIG. 4 according to an embodiment of the present disclosure.

Referring to FIG. 5, UE 1 500 can select cell 1 510 of carrier wave 1 and cell 1 520 of carrier wave 2, and UE 2 510 can select cell 2 511 of carrier wave 1 and cell 1 520 of carrier wave 2. UE 3 502 and UE 4 503 can perform CA by combining various cells as in Table 1.

Table 1 indicates cells selected in carrier wave 1 and carrier wave 2 for each UE in FIG. 5. In all UEs of FIG. 5, it is assumed that carrier wave 1 is a PCell and carrier wave 2 is an SCell.

TABLE 1

| | PCell (Carrier wave 1) | SCell (Carrier wave 2) |
|---|---|---|
| UE 1 (500) | Cell 1 (510) | Cell 1 (520) |
| UE 2 (501) | Cell 2 (511) | Cell 1 (520) |
| UE 3 (502) | Cell 2 (511) | Cell 2 (521) |
| UE 4 (503) | Cell 3 (512) | Cell 3 (522) |

In a wireless scenario of FIG. 5, a criterion for selecting a PCell and an SCell by each UE is according to the intensity of a reception signal for each cell of each carrier wave. In the 3GPP LTE standard, when the intensity of a reception signal of a cell, which is measured by a UE, satisfies a specific condition, an eNB can make a configuration to report a measurement report (MR). A transmission condition of the MR defined in the 3GPP LTE is described below.

Event A1: Intensity of signal of serving cell is larger than threshold value

Event A2: Intensity of signal of serving cell is smaller than threshold value

Event A3: Intensity of signal of neighboring cell is larger than intensity of signal of PCell by offset value or more Event A4: Intensity of signal of neighboring cell is larger than threshold value Event A5: Intensity of signal of PCell is smaller than threshold value 1 and intensity of signal of neighboring cell is larger than threshold value 2

Event A6: Intensity of signal of neighboring cell is larger than intensity of signal of SCell by offset value or more Selection and change of a PCell of a UE supporting the CA start in response to an MR for event A3 or event A5 by a general handover. Selection and change of an SCell starts in response to an MR for event A6.

Figure 6:
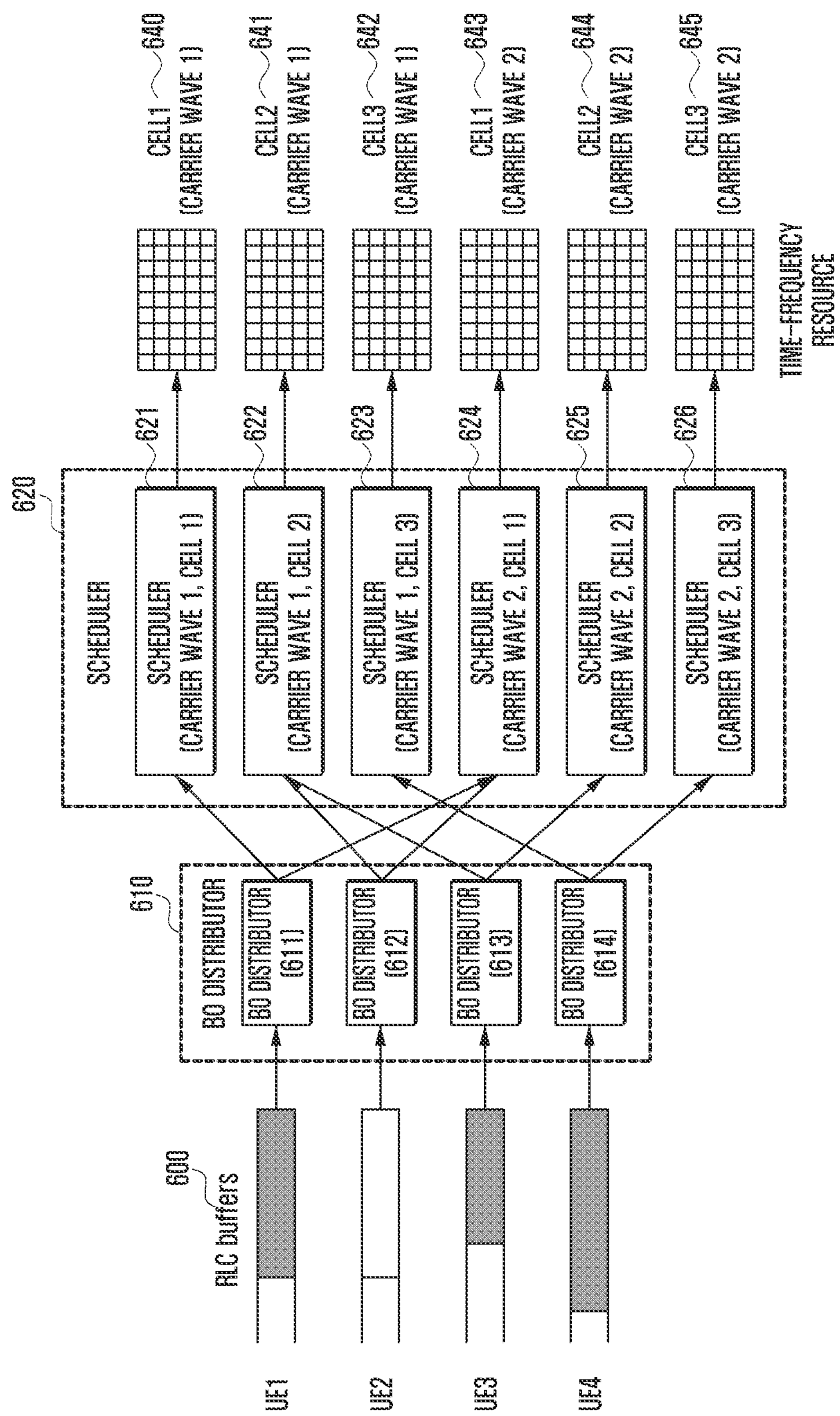
FIG. 6 is a view illustrating a scheduler for performing CA scheduling in an environment as in FIG. 5 according to an embodiment of the present disclosure.

FIG. 6 is a view illustrating a scheduler for performing CA scheduling in an environment as in FIG. 5 according to an embodiment of the present disclosure.

Referring to FIG. 6, since each carrier wave shares an RLC buffer 600 in application of the CA technology, a buffer occupancy (BO) distributor 610 is provided at a buffer output port to divide BO requiring resource allocation and allocate the divided BO to a scheduler 621, 622, 623, 624, 625, and 626 for each carrier wave/each cell (hereinafter, collectively referred to as scheduler 620). BO is an amount of packets occupying a buffer, and the scheduler schedules packet transmission to each UE in a size of BO or less, loads a packet in the corresponding size from a buffer with regard to the scheduled UE, and generates and transmits an MAC layer packet.

When performing scheduling by applying the CA technology, the scheduler for each carrier wave/each cell schedules packet transmission in a size of BO or less allocated by the BO distributor, loads a packet in the corresponding size from a buffer with regard to the scheduled UE, and generates and transmits an MAC layer packet. At this time, the MAC layer packet transmitted to the UE is increased by a multiple of the maximum number of carrier waves as compared with the single carrier wave system. The BO distributor receives an input of the entire BO for each UE, divides the BO in accordance with a cell selected for each carrier wave of each UE, and transmits the divided BO to the corresponding scheduler. A BO distributor 611 of UE 1 distributes the BO to cell 1 640 of carrier wave 1 and cell 1 643 of carrier wave 2, a BO distributor 612 of UE 2 distributes the BO to cell 2 641 of carrier wave 1 and cell 1 643 of carrier wave 2, a BO distributor 613 of UE 3 distributes the BO to cell 2 641 of carrier wave 1 and cell 2 644 of carrier wave 2, and a BO distributor 614 of UE 4 distributes the BO to cell 3 642 of carrier wave 1 and cell 3 645 of carrier wave 2. The scheduler for each carrier wave/each cell schedules packet transmission identically to a UE, which uses a single carrier wave, within the BO allocated to the corresponding UE by the BO distributor and generates a packet, and UE 1 receives a packet from cell 1 of carrier wave 1 and cell 1 of carrier wave 2.

In the inter-site CA technology, considering that coverages of the PCell and the SCell may be different from each other, the CA is performed in a state in which cells having the highest intensity of reception signals with regard to PCell and SCell carrier waves are selected as a PCell and an SCell. The PCell and the SCell are referred to as a serving cell together. In general, in a case of the PCell, when a reference signal received power (RSRP) or a reference signal received quality (RSRQ) of a neighboring cell within the same carrier wave frequency as that of the PCell in a cell boundary becomes larger than that of the current PCell by an offset value configured by an eNB or more, the UE transmits an MR for event A3 and the eNB change the PCell by performing a handover to the corresponding neighboring cell. In a case of the SCell, when an RSRP or an RSRQ of a neighboring cell within the same carrier wave frequency as that of the SCell in a cell boundary becomes larger than that of the current SCell by an offset value configured by the eNB or more, the UE transmits an MR for event A6 and the eNB changes the SCell to the corresponding neighboring cell.

Figure 7:
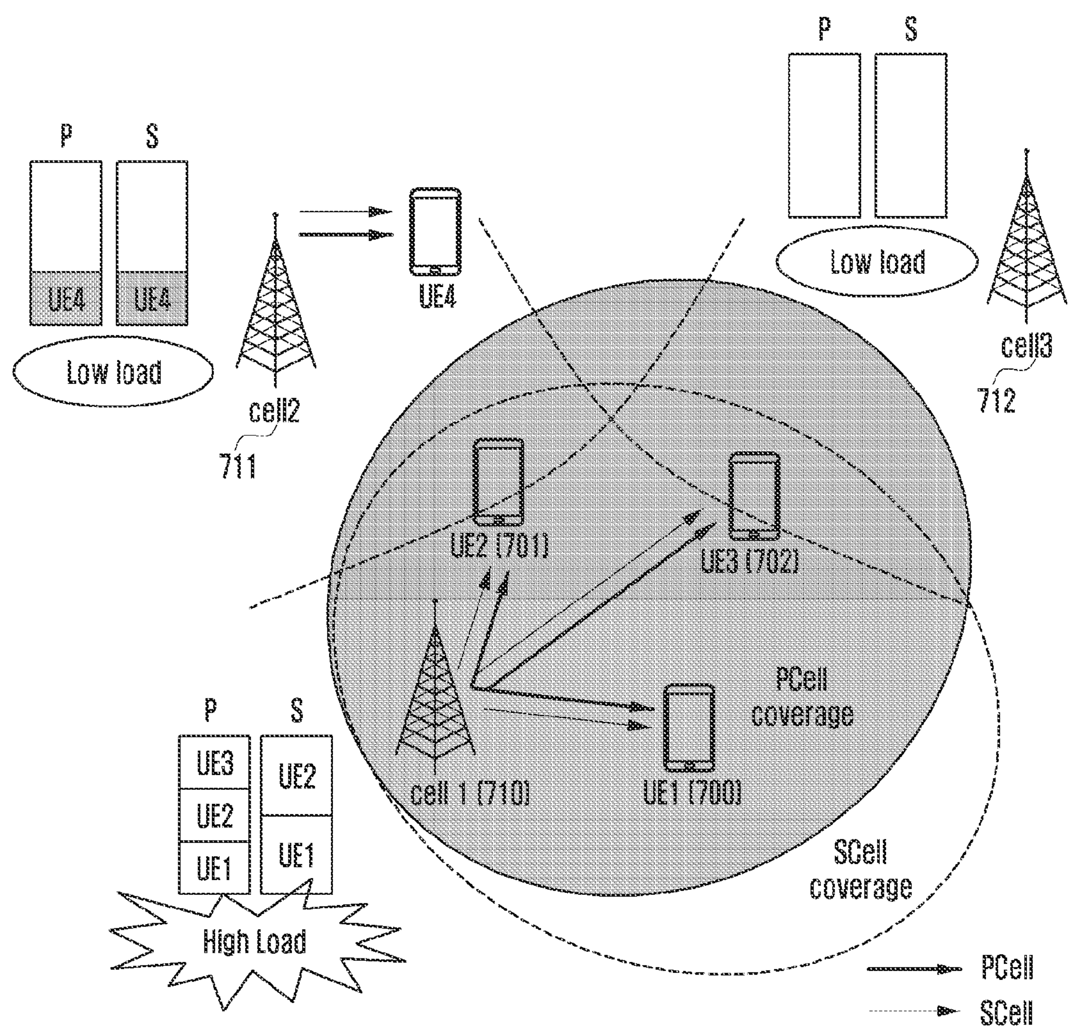
FIG. 7 is a view illustrating an inter-site CA method of selecting a cell according to the intensity of a reception signal in a situation in which coverages of a primary cell (PCell) carrier wave and a secondary cell (SCell) carrier wave are different from each other according to an embodiment of the present disclosure.

FIG. 7 is a view illustrating an inter-site CA method of selecting a cell according to the intensity of a reception signal in a situation in which coverages of a PCell carrier wave and an SCell carrier wave are different from each other according to an embodiment of the present disclosure.

Referring to FIG. 7, all of UE 1 700, UE 2 701, and UE 3 702 select cell 1 710 as a PCell in carrier wave 1 and select cell 1 having the highest intensity of a reception signal in carrier wave 2 as an SCell. However, in an environment in which a plurality of UEs coexist, it is not always optimal that a cell is selected by considering only the intensity of a reception signal.

Figure 8:
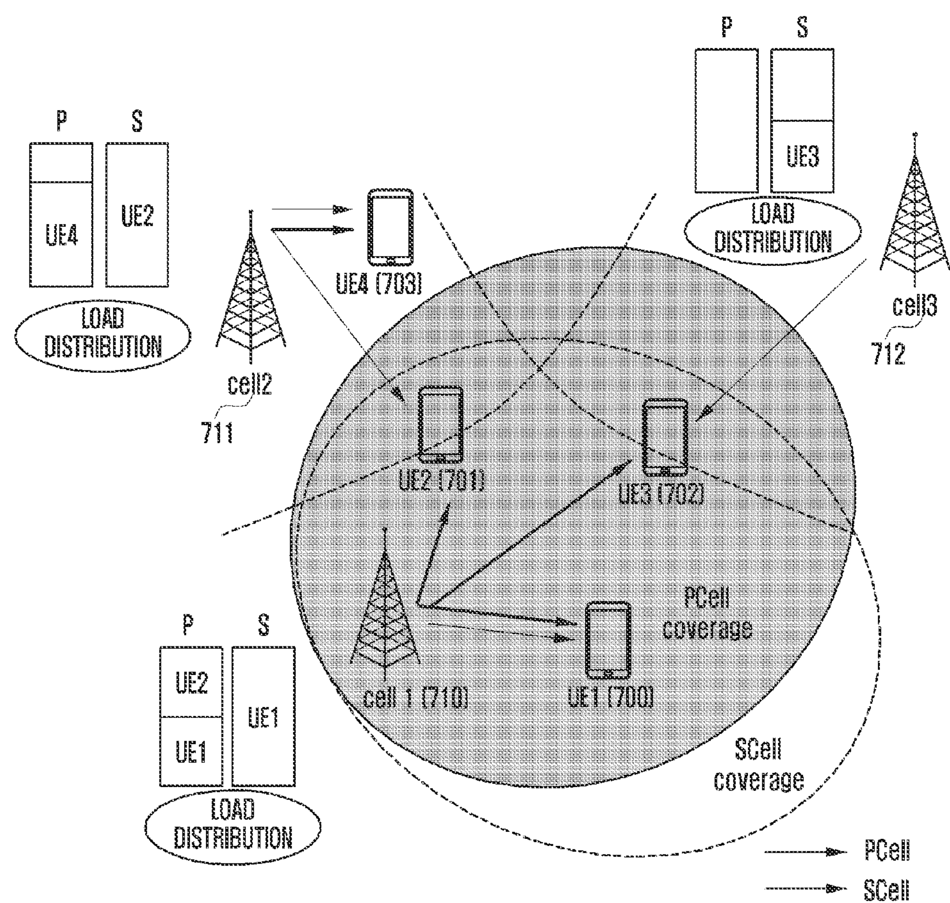
FIG. 8 is a view illustrating an inter-site CA method which is modified in consideration of traffic load of a cell according to an embodiment of the present disclosure.

FIG. 8 is a view illustrating an inter-site CA method which is modified in consideration of traffic load of a cell according to an embodiment of the present disclosure.

Referring to FIG. 8, when cell 1 710 has a large load, cell 2 711 and cell 3 712 have a small load, UE 2 701 has a small difference between the intensities of reception signals of cell 1 and cell 2, and UE 3 702 has a small difference between the intensities of reception signals of cell 1 and cell 3, it is better for UE 2 and UE 3 to select cell 2 and cell 3 instead of cell 1 as an SCell, in terms of resource usage of the entire cell and a throughput of each UE. When it is assumed that UE 1 and UE 2 have heavy traffic, and UE 3 has light traffic, UE 1 and UE 2 greatly increase allocation resources, thereby increasing a processing rate, and UE 3 performs data offloading to cell 3 even without increasing a processing rate, thereby increasing a processing rate of another UE having heavy traffic. The heavy traffic is referred to as traffic of which a processing rate increases as an amount of resources allocated due to a large amount of traffic is larger, and the light traffic is referred to as traffic of which a processing rate no longer increases due to a limit of a traffic amount when an amount of allocated resources exceeds a predetermined amount.

In this way, in an environment in which there is unbalance in a load between cells, since the number of UEs for each cell is different in an actual network, a UE having heavy traffic and a UE having light traffic coexist, and there is a load difference between neighboring cells or between a PCell and an SCell, selecting the best cell based on only the intensity of a reception signal is not considered to be optimal. In order to improve resource usage and a processing rate of the entire cell, it is necessary to select a PCell and an SCell by considering a load between cells as well as the intensity of a reception signal.

The present disclosure relates to an apparatus and method of balancing traffic load between cells using an inter-site CA technology, and an aspect of the present disclosure is to select a cell by considering a load of each cell as well as the existing intensity of a reception signal, and increase a resource usage rate of the entire cell and increase a processing rate by balancing a load between a PCell and an SCell.

The present disclosure proposes an apparatus and method for selecting and changing an optimum serving cell by considering both a load between a serving cell and a neighboring cell and the intensity of a reception signal, and balancing traffic by considering traffic load of a PCell and an SCell for each UE, thereby optimizing load balancing. In the inter-site CA technology, SCells of a plurality of UEs having the same cell as a PCell may be different from each other, or PCells of a plurality of UEs having the same cell as an SCell may be different from each other. In this case, load balancing in the entire cells connected to each other by the inter-site CA can be performed through load balancing between PCell/SCell for each UE. Further, it is possible to increase a resource usage efficiency and improve a processing rate by selecting a cell having light traffic in a cell boundary region as a PCell or an SCell and allocating a resource to the cell.

Figure 9A:
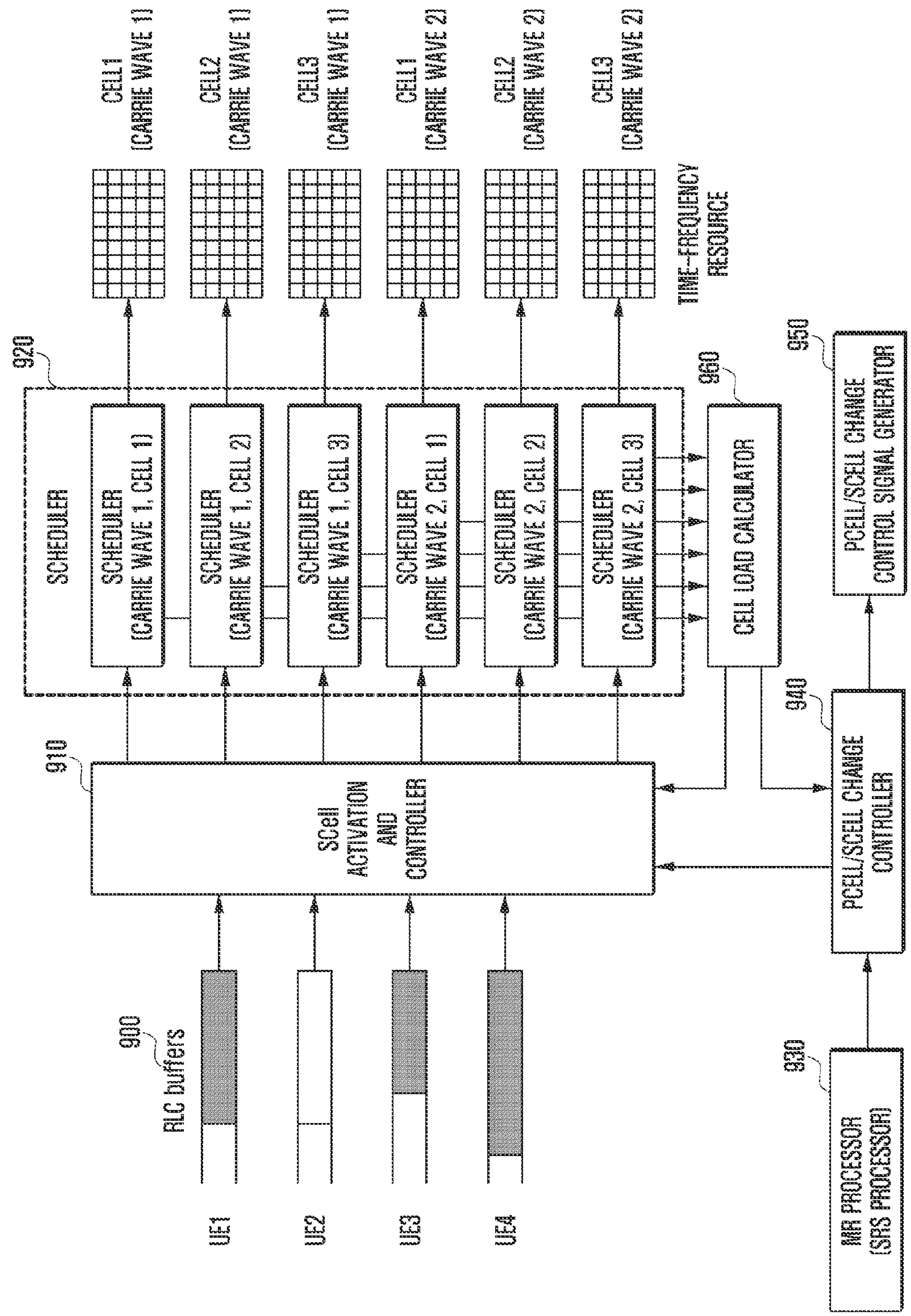
FIG. 9A is a block diagram illustrating an inter-cell traffic load balancing apparatus according to an embodiment of the present disclosure.

FIG. 9A is a block diagram illustrating an inter-cell traffic load balancing apparatus according to an embodiment of the present disclosure.

Referring to FIG. 9A, the apparatus includes an MR processor (or a sounding reference signal (SRS) processor) 930, a PCell/SCell change controller 940, a PCell/SCell change control signal generator 950 (hereinafter, mixedly used with a change control signal generator), a cell load calculator 960, an SCell activation and PCell/SCell BO distribution controller 910, an RLC buffer 900, and a scheduler 920. The apparatus may be located within an eNB.

The MR processor (or the SRS processor) corresponds to an apparatus for measuring the intensities of signals of a serving cell and a neighboring cell using an MR or an SRS transmitted from a UE. The PCell/SCell change controller corresponds to an apparatus for controlling selection or change of a PCell or an SCell according to the intensity of a reception signal and load information of a serving cell and a neighboring cell. The cell load calculator corresponds to an apparatus for calculating loads of a PCell and an SCell, and the load is defined by used amounts of a frequency and a time resource, an amount of average data in a buffer, an amount of resource obtained by subtracting an amount of resources allocable to the corresponding UE from amount of entire resources, etc. The SCell activation and PCell/SCell traffic distribution controller corresponds to an apparatus for controlling distribution of traffic in a buffer to a PCell and an SCell according to loads of the PCell and the SCell of the corresponding UE. The change control signal generator corresponds to an apparatus for generating a signal indicating change of a PCell or an SCell and transmitting the generated signal to the UE, the RLC buffer corresponds to an apparatus for storing traffic, and the scheduler corresponds to an apparatus for allocating a resource to the UE of the corresponding cell. Such an inter-cell traffic load balancing apparatus may be located in a central controller for controlling an eNB or one or more wireless transmission/reception units.

Figure 9B:
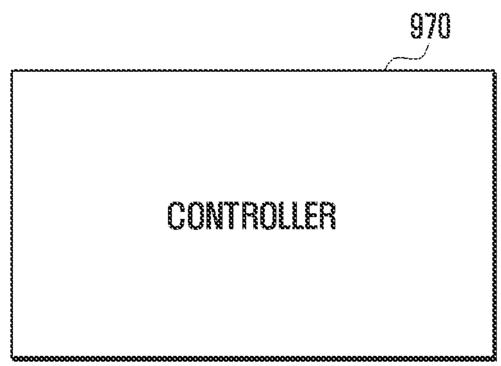
FIG. 9B is a view illustrating another example of the inter-cell traffic load balancing apparatus according to an embodiment of the present disclosure.

FIG. 9B is a view illustrating another example of the inter-cell traffic load balancing apparatus according to an embodiment of the present disclosure.

Referring to FIG. 9B, a controller 970 can make a control to process an MR and the received SRS, determine whether PCell/SCell are changed by calculating a load for each cell, and generate a PCell/SCell change control signal. Further, the controller 970 can control activation and deactivation of the SCell, control BO distribution between a PCell and the SCell, and schedule each cell. All functions, which can be performed by the inter-cell traffic load balancing apparatus of FIG. 9A, can be performed by the controller, and such an inter-cell traffic load balancing apparatus may be located in the central controller for controlling an eNB or one or more wireless transmission/reception unit.

Hereinafter, an example of periodically measuring the intensity of a signal, which can be performed using the inter-cell traffic load balancing apparatus, will be described.

The MR processor (or the SRS processor) can process the intensity of a signal periodically measured by a PCell or an SCell. The MR processor (or the SRS processor) makes a configuration such that a UE periodically transmits an MR, so as to receive an RSRP or an RSRQ of a serving cell and a neighboring cell from the UE, and makes a configuration such that the UE periodically transmits a SRS and thus, each cell receives the SRS, so as to measure the intensity of a signal of the SRS. In the present disclosure, the intensity of a signal implies a signal to interference and noise power ratio (SINR) calculated from an RSRP, an RSRQ, or SRS reception power, or them.

Figure 10:
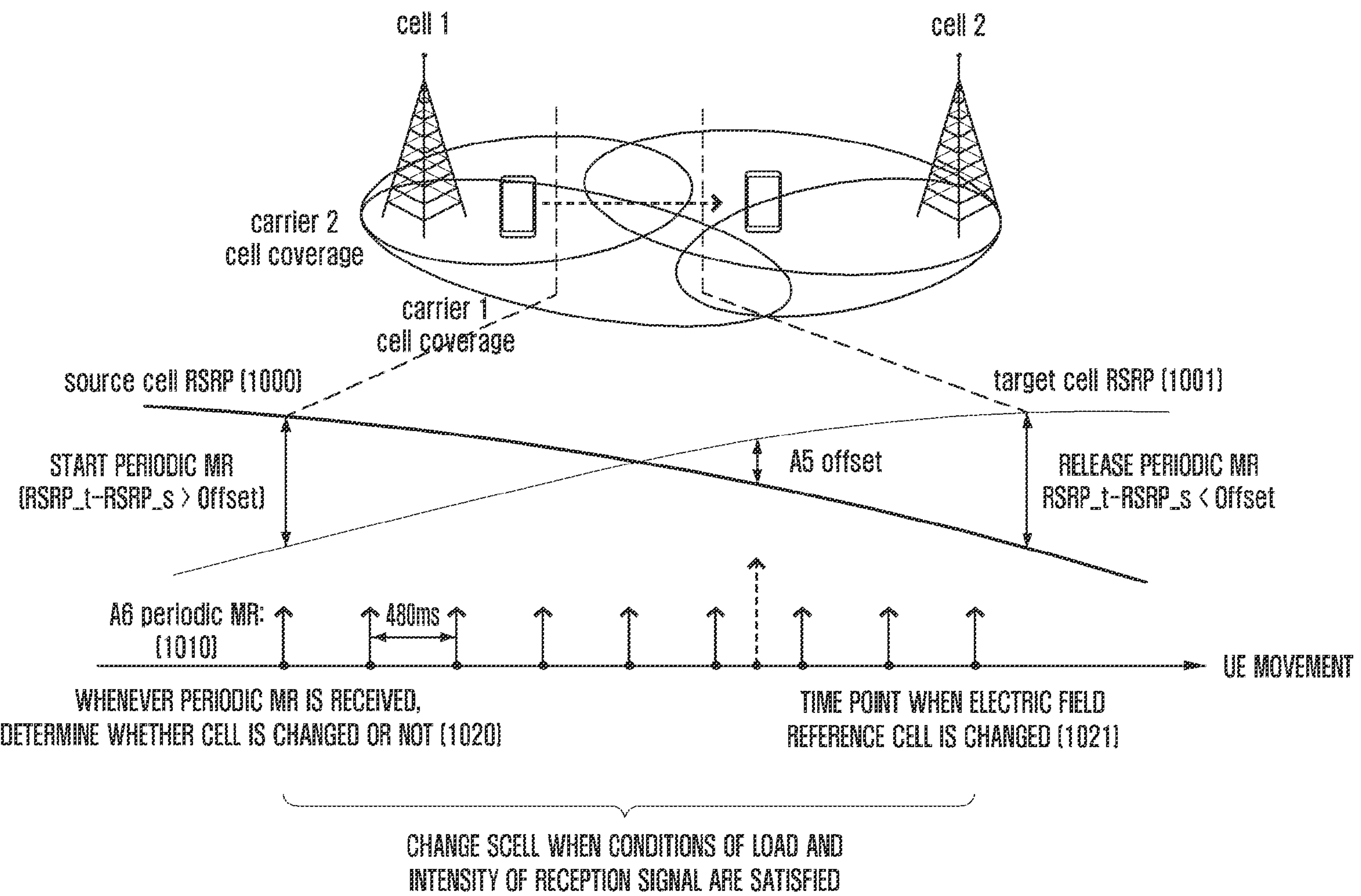
FIG. 10 illustrates an example of measuring the intensity of a reception signal using a periodic measurement report (MR) in an SCell according to an embodiment of the present disclosure.

FIG. 10 illustrates an example of measuring the intensity of a reception signal using a periodic MR in an SCell according to an embodiment of the present disclosure.

Referring to FIG. 10, the MR processor (or the SRS processor) can make a configuration such that a UE periodically transmits an event A6 MR in operation 1010, and the PCell/SCell change controller determines whether a serving SCell is changed or not whenever the MR is received in operation 1020. In particular, the periodic transmission of the MR starts when a difference value between the intensity (RSRP_t) of a signal of a target cell and the intensity (RSRP_s) of a signal of a source cell is larger than a specific offset value, and deactivates when the difference value is smaller than the specific offset value. A period of the periodic transmission of the MR can be configured, and may be configured to be 480 ms as in FIG. 10. The PCell/SCell change controller makes a determination to change an SCell when an RSRP 1000 of an accessing source cell is different from an RSRP 1001 of a target cell which is a target of change by an event A5 offset value in operation 1021. Such a determination and control can be performed in the controller.

Hereinafter, an example of determining whether a PCell or an SCell is changed, which can be performed using the inter-cell traffic load balancing apparatus, will be described.

The PCell/SCell change controller receives the intensities of reception signals of a serving cell and a neighboring cell from the MR processor or the SRS processor, and receives traffic loads of the serving cell and the neighboring cell from the cell load calculator, thereby determining whether the PCell or the SCell is changed. A criterion for determining the change is a data transmission rate. In this case, when a serving cell is changed to a neighboring cell, if the data transmission rate can be increased according to the intensity of a signal and load, the serving cell is changed, or else the serving cell is not changed. UE k changes a serving cell when Equation (1) is satisfied, and maintains the serving cell when Equation (2) is satisfied. Each variable is expressed in a linear scale.

$$(1-L_{nei}(k))\cdot f(SINR_{nei}(k))>(1-L_{srv}(k))\cdot f(SINR_{srv}(k))\times \text{offset} \quad \text{Equation 1}$$

$$(1-L_{nei}(k))\cdot f(SINR_{nei}(k))\leq(1-L_{srv}(k))\cdot f(SINR_{srv}(k))\times \text{offset} \quad \text{Equation 2}$$

In Equations 1 and 2, L_srv(k) and L_nei(k) denote loads of a serving cell and a neighboring cell for UE k and indicate an amount of resources used by other UEs except for UE k from among the entire resources. Thus, (1−L_srv(k)) and (1−L_nei(k)) indicate an amount of resources usable in each of the corresponding cells. SINR_srv(k) and SINR_nei(k) indicate SINRs of UE k of the serving cell and the neighboring cell, calculated from an RSRP, an RSRQ, or SRS power, and f(x) is a function indicating a data transmission rate according to the SINR. Offset, which is a parameter for preventing ping-pong when a cell is changed, has a value of 1 or higher.

The above conditions can be simplified to Equations 3 and 4. The RSRP may be replaced with the SRS or the SINR, all parameters are expressed in a dB scale, and Offset_load(k) is differentially applied according to a load difference between the serving cell and the neighboring cell. When Equation 3 is satisfied, the serving cell is changed, and when Equation 4 is satisfied, the serving cell is maintained.

$$RSRP_{nei}(k)>RSRP_{srv}(k)+\text{offset}_{load}(k)+\text{offset}_{default} \quad \text{Equation 3}$$

$$RSRP_{nei}(k)\leq RSRP_{srv}(k)+\text{offset}_{load}(k)+\text{offset}_{default} \quad \text{Equation 4}$$

Figure 11:
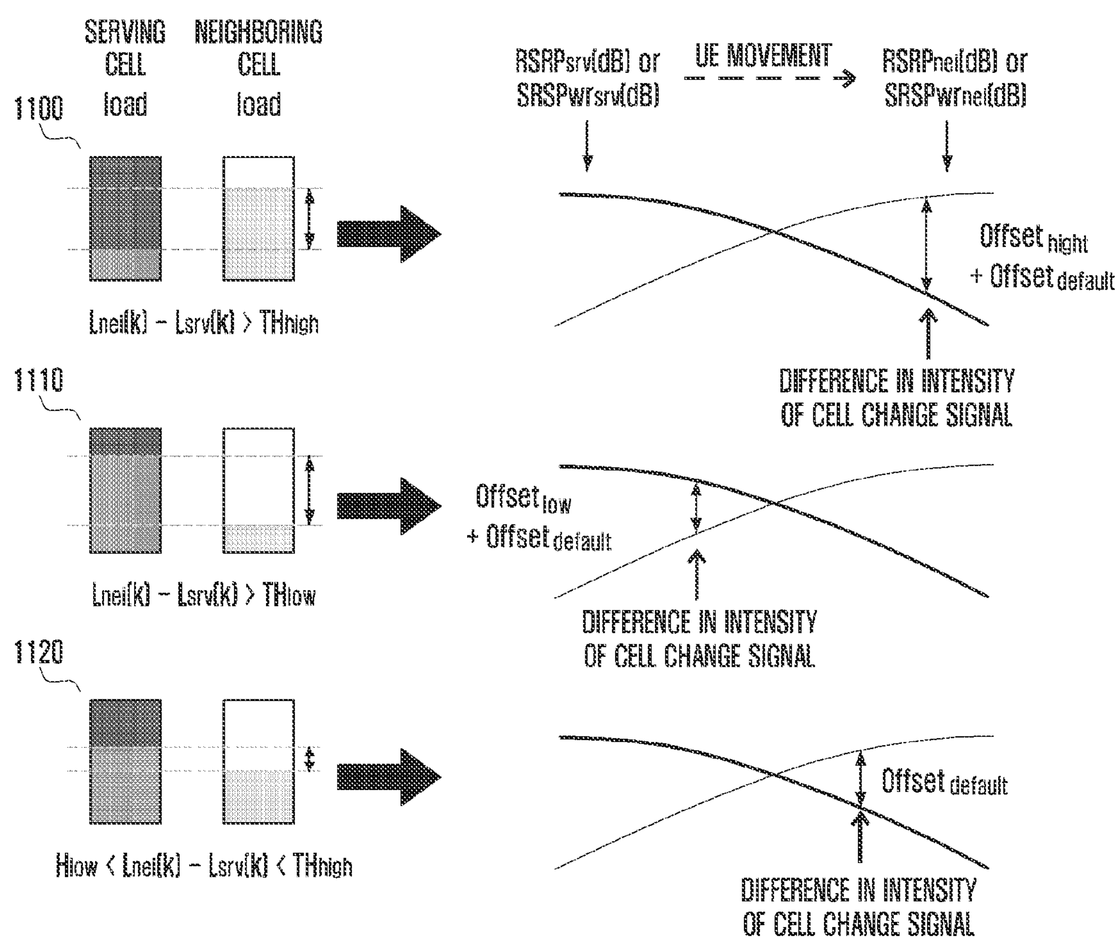
FIG. 11 is a view illustrating a method of selecting a serving cell to a neighboring cell according to a value of Offset_load(k) according to an embodiment of the present disclosure.

FIG. 11 is a view illustrating a method of selecting a serving cell to a neighboring cell according to a value of Offset_load(k) according to an embodiment of the present disclosure.

Referring to FIG. 11, Offset_load(k), which is a function of a load difference between the serving cell and the neighboring cell, makes a change from the serving cell to the neighboring cell difficult by increasing an offset when a load of the neighboring cell is larger, as indicated by reference numeral 1100, makes the change from the serving cell to the neighboring cell easy by decreasing the offset when a load of the serving cell is larger, as indicated by reference numeral 1110, and uses a basic offset value when a load difference is not large, as indicated by reference numeral 1120.

Figure 12A:
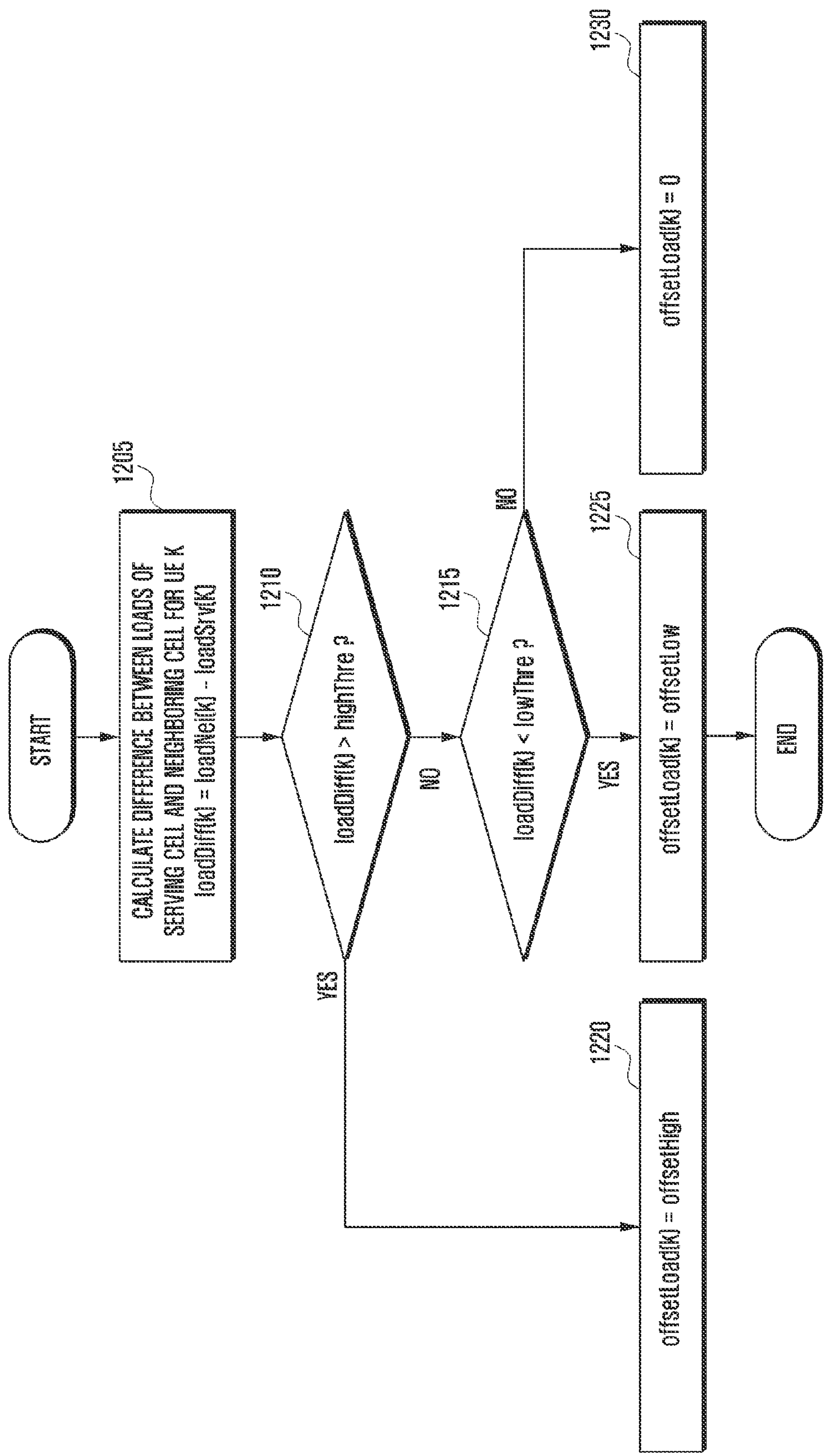
FIG. 12A is a flowchart illustrating a method of determining a value of an offset according to a load of an inter-cell traffic load balancing apparatus according to an embodiment of the present disclosure.
Figure 12B:
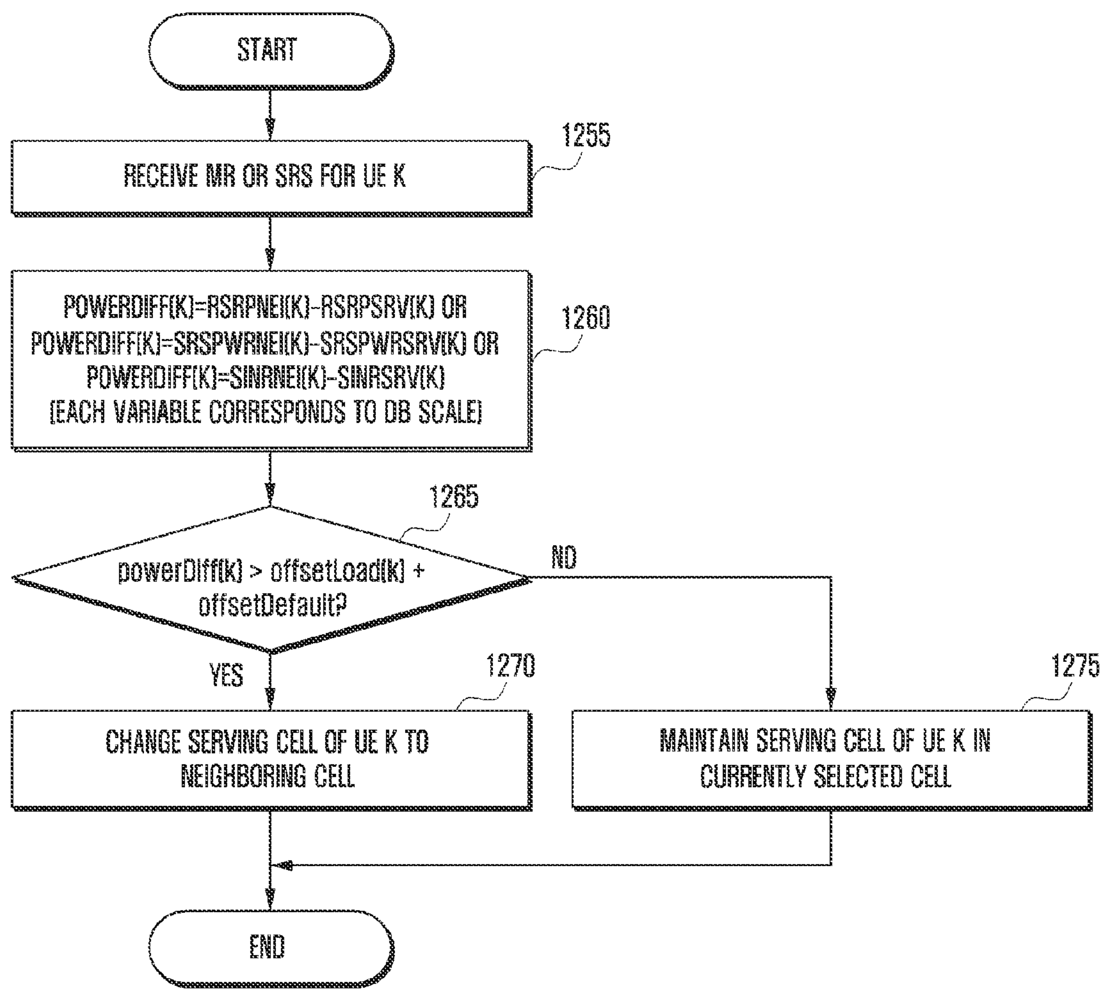
FIG. 12B is a flowchart illustrating a method of determining change or maintaining of a serving cell according to the intensity of a signal of the inter-cell traffic load balancing apparatus according to an embodiment of the present disclosure.

FIGS. 12A and 12B are flowcharts illustrating a method of changing a serving cell of an inter-cell traffic load balancing apparatus according to various embodiments of the present disclosure.

FIG. 12A is a flowchart illustrating a method of determining a value of an offset according to a load of an inter-cell traffic load balancing apparatus.

Referring to FIG. 12A, the cell load calculator calculates a load difference between a serving cell and a neighboring cell for UE k. loadDiff(k), which is a load difference between the serving cell and the neighboring cell, is defined to be loadNei(k)−loadSrv(k) (load of neighboring cell—load of serving cell) in operation 1205. The PCell/SCell change controller determines whether loadDiff(k) is larger than highThre in operation 1210. highThre, which is a first threshold value of a difference between the neighboring cell and the serving cell, is a value larger than 0. When loadDiff(k) is larger than highThre, offsetLoad(k) is configured to be offsetHigh in operation 1220. offsetHigh, which is a parameter for determining offsetLoad(k), is a value larger than 0. When loadDiff(k) is not larger than highThre, it is determined whether loadDiff(k) is smaller than lowThre in operation 1215. lowThre, which is a second threshold value of a difference between the neighboring cell and the serving cell, is a value smaller than 0. When loadDiff(k) is larger than lowThre, offsetLoad(k) is configured to be offsetlow in operation 1225. offsetLow, which is a parameter for determining offsetLoad(k), is a value smaller than 0. When loadDiff(k) is not smaller than lowThre, offsetLoad(k) is configured to be 0 in operation 1230.

In the above method, the cases are classified into a case where the load difference between the serving cell and the neighboring cell is larger than highThre, a case where the load difference is smaller than lowThre, and a case where the load difference is between lowThre and highThre. However, it is obvious that the cases can be classified into more cases. The above method includes a predetermined function satisfying a rule in which when loadDiff is a positive number, offsetLoad is also a positive number, when loadDiff is increased, offsetLoad is also increased, when loadDiff is a negative number, offsetLoad is also a negative number, and when loadDiff is decreased, offsetLoad is also decreased. Such a determination and control can be performed in the controller.

FIG. 12B is a flowchart illustrating a method of determining change or maintaining of a serving cell according to the intensity of a signal of the inter-cell traffic load balancing apparatus.

Referring to FIG. 12B, the MR processor (or the SRS processor) calculates power of the SRS by receiving the MR or the SRS transmitted from UE k in operation 1255. The PCell/SCell change controller calculates powerDiff(k) defined to be a value obtained by subtracting an RSRP value of the serving cell from an RSRP value of the neighboring cell (rsrpNei(k)−rsrpSrv(k)), a value obtained by subtracting SRS transmission power of the serving cell from SRS transmission power of the neighboring cell (srsPwrNei(k)−srsPwrSrv(k)), or a value obtained by subtracting an SINR value of the serving cell from an SINR value of the neighboring cell in operation 1260. Each variable is calculated in a dB scale. The PCell/SCell change controller determines whether powerDiff(K) is larger than a value obtained by adding offsetDefault(k) to offsetLoad(k) calculated in FIG. 12A in operation 1265. The PCell/SCell change controller changes the serving cell of UE k to the neighboring cell when powerDiff(k) is larger than a value obtained by adding offsetDefault(k) to offsetLoad(k) in operation 1270. When powerDiff(k) is not larger than the value obtained by adding offsetDefault(k) to offsetLoad(k), the serving cell of UE k is maintained as a currently selected cell in operation 1275. Such a determination and control can be performed in the controller.

Hereinafter, an example of a method of controlling SCell activation, which can be performed using the inter-cell traffic load balancing apparatus, will be described.

When the serving cell is determined using the above method, if more traffic is allocated to a serving cell having less traffic from among the PCell and the SCell, loads between UEs are distributed, thereby improving a data transmission rate. In particular, the SCell can be activated or deactivated by the eNB. In this case, a UE having heavy traffic activates an SCell thereof, thereby improving a data transmission rate thereof, and a UE having less traffic deactivates an SCell thereof, thereby reducing power consumption. However, in order to distribute a load, when a load of the PCell is small, only UEs having much data in buffers activate SCells to transmit a large amount of traffic from the PCells, and when a load of the PCell is large, UEs having less data in buffers also activate SCells to distribute a large amount of traffic to the SCells, thereby distributing a load.

Figure 13A:
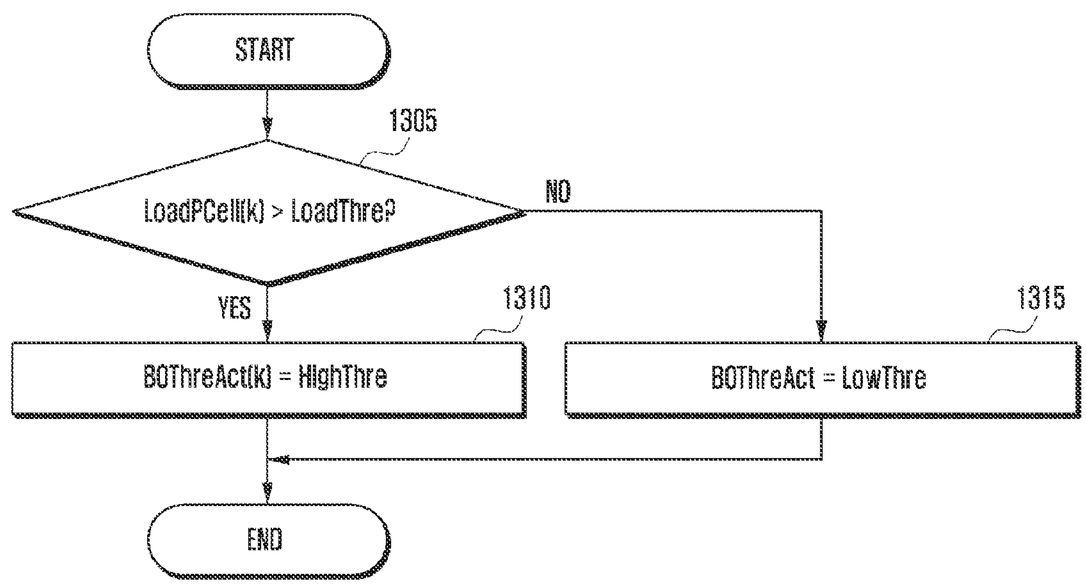
FIG. 13A is a flowchart illustrating a method of determining an activation threshold value of an SCell according to an embodiment of the present disclosure.
Figure 13B:
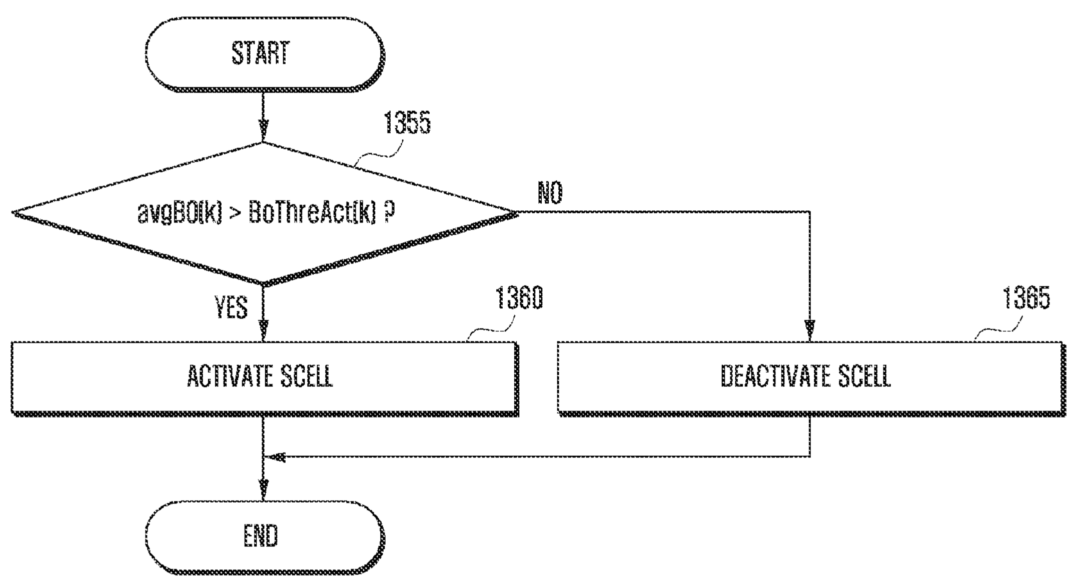
FIG. 13B is a flowchart illustrating an activation algorithm of an SCell according to an embodiment of the present disclosure.

FIGS. 13A and 13B are flowcharts illustrating an operation of activating an SCell according to an embodiment of the present disclosure.

FIG. 13A is a flowchart illustrating a method of determining an activation threshold value of an SCell.

Referring to FIG. 13A, the SCell activation and PCell/SCell BO distribution controller determines whether load information LoadPCell(k) of a PCell of UE k is larger than LoadThre, by receiving the load information from the cell load calculator in operation 1305. LoadThre implies a threshold value of traffic load for determining an SCell activation threshold value. When LoadPCell(k) is larger than loadThre, BoActThre which is a BO threshold value for activating an SCell is configured as HighThre corresponding to a large value in operation 1310. HighThre implies a first BO threshold value. In contrast, when LoadPCell(k) is not larger than LoadThre, BoActThre is configured as LowThre in operation 1315. LowThre implies a second BO threshold value, and HighThre is larger than LowThre. Such a determination and control can be performed in the controller.

FIG. 13B is a flowchart illustrating an activation algorithm of an SCell according to an embodiment of the present disclosure.

Referring to FIG. 13B, the SCell activation and PCell/SCell BO distribution controller determines whether avgBo which is a movement average value of BO is larger than BoActThre configured in FIG. 13A in operation 1355. When avgBo is larger than BoActThre, the SCell activation and PCell/SCell BO distribution controller activates an SCell in operation 1360, or else maintains a deactivated state in operation 1365. Such a determination and control can be performed in the controller.

Hereinafter, an example of a method of controlling a PCell/SCell BO distribution, which can be performed using the inter-cell traffic load balancing apparatus, will be described.

When the serving cell is determined using the above method, if more traffic is allocated to a serving cell having less traffic from among the PCell and the SCell, loads between UEs are distributed, thereby improving a data transmission rate. When a UE having a small amount of data in a buffer has a PCell having heavy traffic and an SCell having light traffic, if all traffic is allocated to the SCell, data transmission rates of other UEs belonging to the PCell can be improved. Thus, when both the PCell and the SCell have heavy traffic or both have light traffic, BO is distributed in proportion to a transmittable rate according to a channel quality of the corresponding cell, and when one of the PCell and the SCell has heavy traffic and the other one cell has light traffic, the BO can be distributed while a weight value is given to the corresponding cell.

Figure 14:
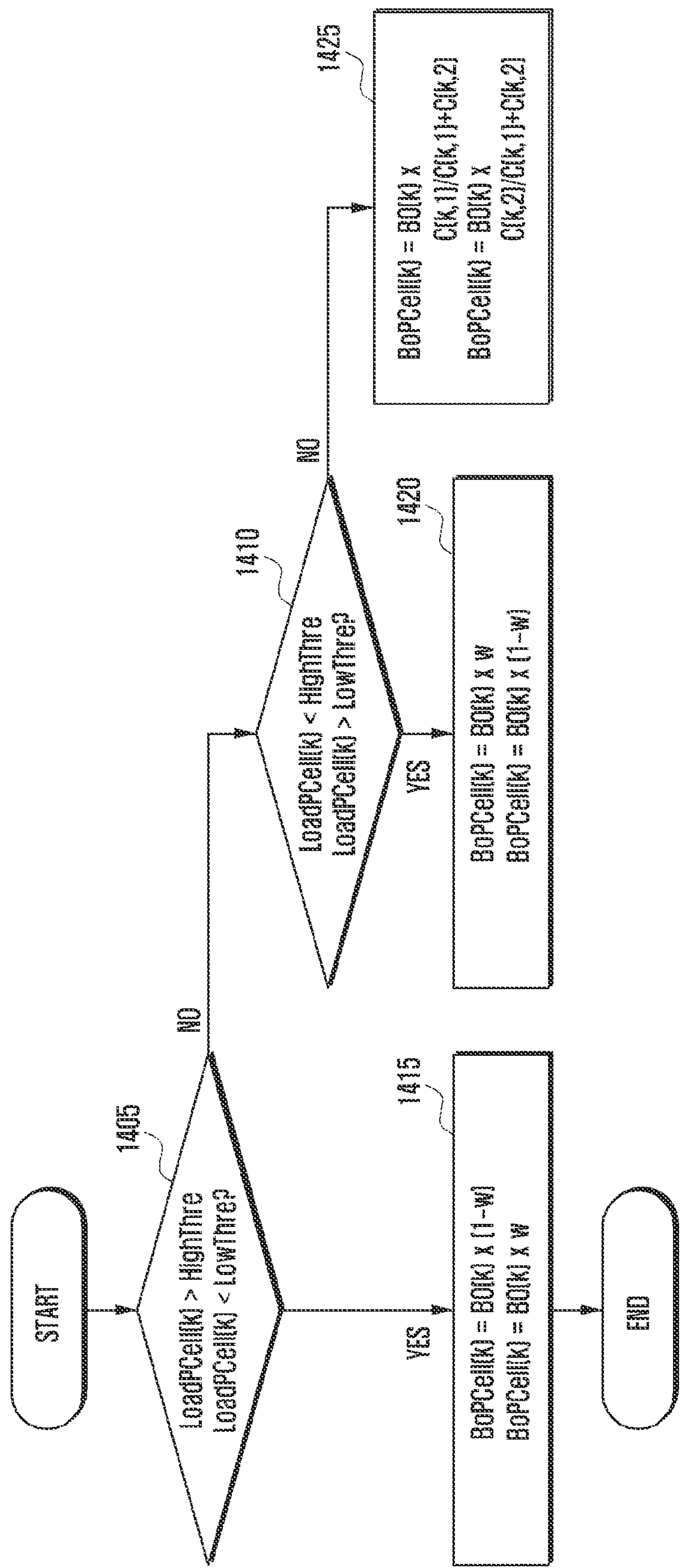
FIG. 14 is a flowchart illustrating a buffer occupancy (BO) distribution operation according to a PCell-SCell load for load balancing optimization according to an embodiment of the present disclosure.

FIG. 14 is a flowchart illustrating a BO distribution operation according to a PCell-SCell load for load balancing optimization according to an embodiment of the present disclosure.

Referring to FIG. 14, the SCell activation and PCell/SCell BO distribution controller determines whether LoadPCell(k) corresponding to a load of a PCell of UE k is larger than HighThre and LoadSCell(k) corresponding to a load of an SCell is smaller than LowThre in operation 1405. When the condition of operation 1405 is satisfied, BoPCell(k), which is BO allocated to the PCell, is configured to be BO(k)*(1−w), and BoSCell(k), which is BO allocated to the SCell, is configured to be BO(k)*w in operation 1415. BO(k) implies the entire BO of UE k. When the condition of operation 1405 is not satisfied, the SCell activation and PCell/SCell BO distribution controller determines whether LoadPCell(k) is smaller than lowThre and LoadSCell(k) is larger than HighThre in operation 1410. When the condition of operation 1410 is satisfied, BoPCell(k) is configured to be BO(k)*w and BoSCell(k) is configured to be BO(k)*(1−w) in operation 1420. When the condition of operation 1410 is not satisfied, BoPCell(k) is configured to be BO(k)*C(k,1)/(C(k,1)+C(k,2)) and BoSCell(k) is configured to be BO(k)*(C(k,2)/C(k,1)+C(k,2) in operation 1425.

w, which is a weight point, is larger than 0.5 and equal to or smaller than 1. C(k,1) and C(k,2) indicate a data transmission rate of the PCell and the SCell of UE k, respectively. Such a determination and control can be performed in the controller.

According to the present disclosure, when the inter-site CA technology is implemented, a PCell and a SCell are selected additionally considering a load of each cell as compared with the existing scheme in which a PCell and an SCell are selected considering only the intensity of a reception signal, so that an inter-cell traffic load is distributed, and eventually, a resource utilization efficiency of the entirety of a network is increased and a throughput is improved. The configuration and the operation of the present disclosure are not limited to the CA system using two carrier waves, and can be expanded to a scheme comprising performing load balancing by considering a load of each cell even when three or more carrier waves are used.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of changing a serving cell by an evolved Node B (eNB) in a wireless communication system using inter-cell carrier aggregation (CA), the method comprising:

calculating a difference value between a load of a current serving cell for a first user equipment (UE) and a load of a neighboring cell for the first UE;

determining a load offset of the first UE based on the difference value between the loads of the current serving cell and the neighboring cell for the first UE; and changing a serving cell of the first UE as the neighboring cell based on a comparison between the load offset of the first UE and a power difference value between the current serving cell and the neighboring cell, wherein the load of the current serving cell for the first UE is an amount of resources used by UEs other than the first UE from among resources of entire serving cells, and the load of the neighboring cell for the first UE is an amount of resources used by UEs from among resources of entire neighboring cells.

2. The method of claim 1, wherein determining the load offset of the first UE further comprises:

determining the load offset of the first UE as a first offset if the difference value between the current serving cell and the neighboring cell for the first UE is larger than the first threshold value;

determining the load offset of the first UE as a second offset if the difference value between the current serving cell and the neighboring cell for the first UE is lower than the second threshold value, wherein the first threshold value and the first offset is larger than 0, and the second threshold value and the second offset is smaller than 0.

3. The method of claim 2, wherein determining the load offset of the first UE further comprises:

determining the load offset of the first UE as 0 if the difference value between the current serving cell and the neighboring cell for the first UE is not larger than the first threshold value and lower than the second threshold value.

4. The method of claim 1, wherein the power difference value between the current serving cell and the neighboring cell is one of a value obtained by subtracting a reference signal received power (RSRP) of the current serving cell from an RSRP of the neighboring cell, a value obtained by subtracting sounding reference signal (SRS) reception power of the current serving cell from SRS reception power of the neighboring cell, or a value obtained by subtracting a signal to interference and noise power ratio (SINK) value of the current serving cell from an SINK value of the neighboring cell.

5. The method of claim 1, wherein changing the serving cell of the first UE further comprises:

changing the serving cell of the first UE as the neighboring cell if the power difference value between the current serving cell and the neighboring cell is larger than a value obtained by adding the load offset and a default offset of the first UE.

6. The eNB of claim 1, wherein the serving cell of the first UE is not changed if the power difference value between the current serving cell and the neighboring cell is not larger than a value obtained by adding the load offset and a default offset of the first UE.

7. An evolved node B (eNB) for changing a serving cell in a wireless communication system using inter-site carrier aggregation (CA), the eNB comprising:

a controller configured to control to:

calculate a difference value between a load of a current serving cell for a first user equipment (UE) and a load of a neighboring cell for the first UE, determine a load offset of the first UE based on the difference value between the loads of the current serving cell and the neighboring cell for the first UE, and change a serving cell of the first UE as the neighboring cell based on a comparison between the load offset of the first UE and a power difference value between the current serving cell and the neighboring cell, wherein the load of the serving cell for the first UE is an amount of resources used by UEs other than the first UE from among resources of entire serving cells, and the load of the neighboring cell for the first UE is an amount of resources used by UEs from among resources of entire neighboring cells.

8. The eNB of claim 7, wherein the controller is configured to control to:

determine the load offset of the first UE as a first offset if the difference value between the current serving cell and the neighboring cell for the first UE is larger than the first threshold value, determine the load offset of the first UE as a second offset if the difference value between the current serving cell and the neighboring cell for the first UE is lower than the second threshold value, wherein the first threshold value and the first offset is larger than 0, and the second threshold value and the second offset is smaller than 0.

9. The eNB of claim 8, wherein the controller is configured to control to determine the load offset of the first UE as 0 if the difference value between the current serving cell and the neighboring cell for the first UE is not larger than the first threshold value and lower than the second threshold value.

10. The eNB of claim 7, wherein the controller is configured to change the serving cell of the first UE as the neighboring cell if the power difference value between the current serving cell and the neighboring cell is larger than a value obtained by adding the load offset and a default offset of the first UE.

11. The eNB of claim 7, wherein the power difference value between the current serving cell and the neighboring cell is one of a value obtained by subtracting a reference signal received power (RSRP) of the current serving cell from an RSRP of the neighboring cell, a value obtained by subtracting sounding reference signal (SRS) reception power of the current serving cell from SRS reception power of the neighboring cell, or a value obtained by subtracting a signal to interference and noise power ratio (SINK) value of the current serving cell from an SINK value of the neighboring cell.

12. The method of claim 1, wherein the serving cell of the first UE is not changed if the power difference value between the current serving cell and the neighboring cell is not larger than a value obtained by adding the load offset and a default offset of the first UE.

* * * * *